United States Patent
Huang et al.

(10) Patent No.: US 8,879,398 B2
(45) Date of Patent: Nov. 4, 2014

(54) CLOUD SYSTEM AND METHOD FOR CONNECTING VIRTUAL MACHINES IN THE CLOUD SYSTEM

(71) Applicant: Delta Electronics, Inc., Taoyuan County (TW)

(72) Inventors: Wen-Min Huang, Taoyuan County (TW); Sze-Yeong Tan, Taoyuan County (TW)

(73) Assignee: Delta Electronics, Inc. (TW)

( * ) Notice: Subject to any disclaimer, the term of this patent is extended or adjusted under 35 U.S.C. 154(b) by 90 days.

(21) Appl. No.: 13/757,244

(22) Filed: Feb. 1, 2013

(65) Prior Publication Data
US 2013/0301473 A1 Nov. 14, 2013

(30) Foreign Application Priority Data

May 11, 2012 (TW) .............................. 101116772 A (51) Int. Cl.
*H04L 12/26* (2006.01)
*H04L 12/28* (2006.01)
*G06F 15/16* (2006.01)
*H04L 12/931* (2013.01)
*H04L 29/08* (2006.01)
*G06F 9/50* (2006.01)
*H04L 12/46* (2006.01)
*H04L 12/24* (2006.01)
*H04L 29/06* (2006.01)

(52) U.S. Cl.
CPC ................ *H04L 41/12* (2013.01); *H04L 49/70* (2013.01); *H04L 67/10* (2013.01); *G06F 9/5072* (2013.01); *H04L 12/46* (2013.01); *H04L 41/046* (2013.01); *H04L 67/1097* (2013.01); *H04L 41/0853* (2013.01); *H04L 67/38* (2013.01); *H04L 67/34* (2013.01)
USPC ........ 370/238; 370/254; 370/395.2; 370/400; 709/227

(58) Field of Classification Search
CPC . H04L 12/46; H04L 12/4641; H04L 12/4662; H04L 12/465; H04L 12/4654; H04L 12/4658; H04L 12/4675; H04L 41/046; H04L 41/0853; H04L 41/12; H04L 45/12; H04L 45/586; H04L 49/70; H04L 49/354; H04L 67/10; H04L 67/1097; H04L 67/34; H04L 67/38; H04L 2012/5617; G06F 9/5077
USPC ............................ 370/229–255, 386–395.21, 370/395.5–395.53, 400–401; 709/220–245, 709/249–250
See application file for complete search history.

(56) References Cited

U.S. PATENT DOCUMENTS

| | | | |
|---|---|---|---|
| 8,392,608 B1 * | 3/2013 | Miller et al. | 709/238 |
| 2010/0251329 A1 * | 9/2010 | Wei | 726/1 |
| 2013/0195111 A1 * | 8/2013 | Allan et al. | 370/395.53 |
| 2013/0286817 A1 * | 10/2013 | Allan | 370/221 |
| 2014/0098673 A1 * | 4/2014 | Lee et al. | 370/238 |
| 2014/0099119 A1 * | 4/2014 | Wei et al. | 398/79 |

* cited by examiner

*Primary Examiner* — Tri H Phan
(74) *Attorney, Agent, or Firm* — Lowe Hauptman & Ham, LLP (57) ABSTRACT

A method for connecting virtual machines in a cloud system is disclosed, wherein an agent network management service (Network management service, ANMS) process is used for communicating with all switches in the cloud system. When a virtual machine (VM) is created on one of the physical host in the cloud system, the ANMS detects the creation of the new VM, and confirms the virtual local area network (VLAN) the new VM pertained to. Next, determine a nearest boundary point from the new VM in the same VLAN for confirming a shortest connecting route. Lastly, the ANMS informing all switches in the shortest connecting route to set up internal VLAN tags such that new VM establish connection with other VMs in the same VLAN via the shortest connecting route.

20 Claims, 9 Drawing Sheets

CLOUD SYSTEM AND METHOD FOR CONNECTING VIRTUAL MACHINES IN THE CLOUD SYSTEM

This application is based on and claims priority from Taiwan Application No. 101116772, filed May 11, 2012, the disclosure of which is hereby incorporated by reference herein in its entirety.

BACKGROUND OF THE INVENTION

1. Field of the Invention

The present invention relates to a system and a method for connecting virtual machines, particularly relates a connection method used in a cloud system for setting up switches in a cloud system such that all virtual machines in the same virtual local area network are able to establish connection with and transfer data packets to each other.

2. Description of Related Art

Figure 1:
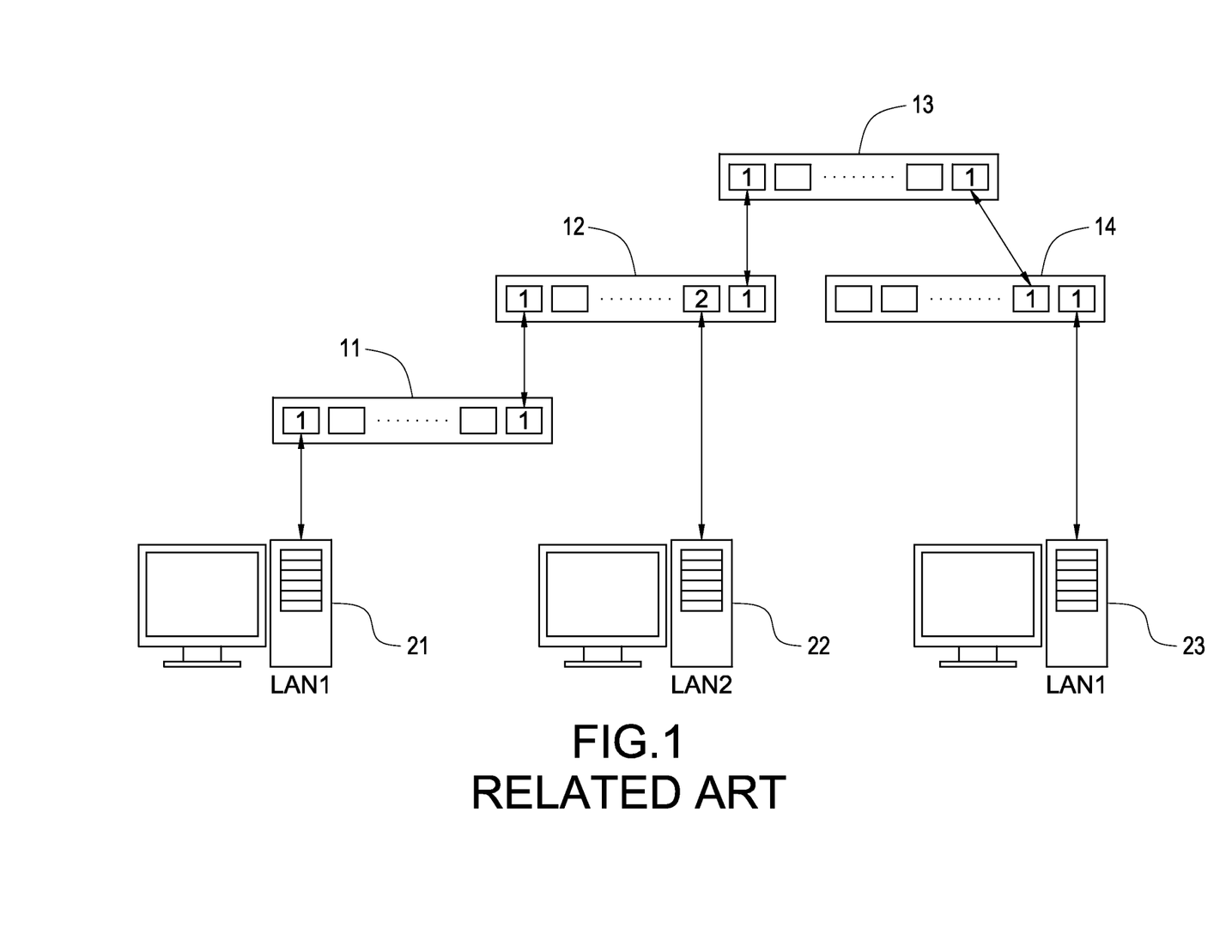
FIG. 1 is a schematic diagram of a cloud system in the related art.

The current cloud system is composed of a plurality of switches and a plurality of physical hosts (PMs). FIG. 1 is a schematic diagram of a cloud system in the related art. In FIG. 1, there are four switches 11-14 and three physical hosts 21-23 used in the system.

Each switch 11-14 all has a plurality of connecting ports. Each switch 11-14 respectively inter-connects and connects with the physical hosts 21-23 via the connecting ports on the switch. As shown in FIG. 1, the switch 11 connects with the physical host 21 and the switch 12 via the connecting port of the switch. The switch 12 connects with the physical host 22, the switch 11 and 13. The switch 13 connects with the switch 12 and 14. The switch 14 connects with the switch 13 and the physical host 23.

The physical host 21-23 respectively pertains to different Local Area Network (LAN). As shown in FIG. 1, the physical host 21 and 23 pertains to LAN1, and the physical host 22 pertains to LAN2. In the embodiment, the physical host 21 and 23 establishes connection with each other for inter-transferring data packets. The physical host 22 only establish connection with other physical hosts (not shown in the diagram) pertained to the same LAN2, and cannot connect with the physical hosts 21 and 23.

Generally, the switches 11-14 set up LAN tag of the connecting port on the switches for confirming the data packets transmission of which LAN from the connecting ports is respectively permitted. As shown in FIG. 1, the physical hosts 21 and 23 establish connection, because corresponding connecting ports of the switches 11-14 are all attached with LAN1 tag. In other words, the connecting ports tagged "1" permit data packets transmission of the LAN1.

In further details, several virtual machines (VM) (not shown in the diagram) are respectively created on the physical hosts 21-23, and the virtual machines pertain to different virtual local area networks (VLAN). Several virtual machines of the same physical host share the same network cable for connecting to the same connecting port of the same switch.

Currently, administrators record which connecting ports on the switches 11-14 respectively connects to which physical hosts 21-23, and which physical hosts 21-23 respectively pertains to which LANs. Further, the LAN tags of connecting ports of the switches 11-14 are manually set up for establish connections with physical hosts pertained to the same LAN.

Nonetheless, different from the stable characteristic of physical hosts after the installation, virtual machines typically are created, migrated and deleted frequently. Along with the virtual machines changes, the switches 11-14 are required to update the setup of the VLAN tags.

As mentioned above, using manual operations to setup and manage the VLAN tags are slow and unable to keep up with the changes of the virtual machines. Because the quantity of virtual machines in a cloud system is numerous, the risk incorrect setup resulted from human errors leading to network glitches is increasing accordingly.

SUMMARY OF THE INVENTION

The objective of the present invention is to provide a method for connecting virtual machines in a cloud system. When a physical host creates a new VM, the physical host automatically communicates with the switch, and requesting the switch to setup a VLAN tag such that the new VM establishes connections with other VMs of the same VLAN in a cloud system.

In order to achieve the above, an ANMS process of the present invention is used for communicating with all switches in a cloud system. When one of the physical host in the cloud system creates a new VM, the ANMS detects the creation of the new VM, of the VLAN the new VM pertained to. Next, determine a nearest boundary point from the new VM in the same VLAN for confirming the shortest connecting route. Lastly, the ANMS requests all switches in the shortest connecting route to set up VLAN tags such that the new VM is allowed to establish connections with other VMs of the same VLAN in the shortest connecting route.

Compare to related art, the advantage achieved of the present invention is that the ANMS proactively detects the creation of the new VM, and confirms which VLAN the new VM pertained to. Thus, the ANMS automatically communicates with related switches in the cloud system and requests the switches to set up internal VLAN tags. Accordingly, administrators do not need to look up in a table for recording which VM is created in which physical host, and do not need to manually set up VLAN tags for numerous switches. Thus, not only the speed of establishing connections and cutting down connections between VMs is increased, also the network breakdown occurred due to human errors of set up is avoided.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Embodiments are provided in the following in order to further detail the implementations of the present invention the summary. It should be noted that objects used in the diagrams of the embodiments are provided with proportions, dimensions, deformations, displacements and details are examples and the present invention is not limited thereto and identical components in the embodiments are the given same component numbers.

Figure 2:
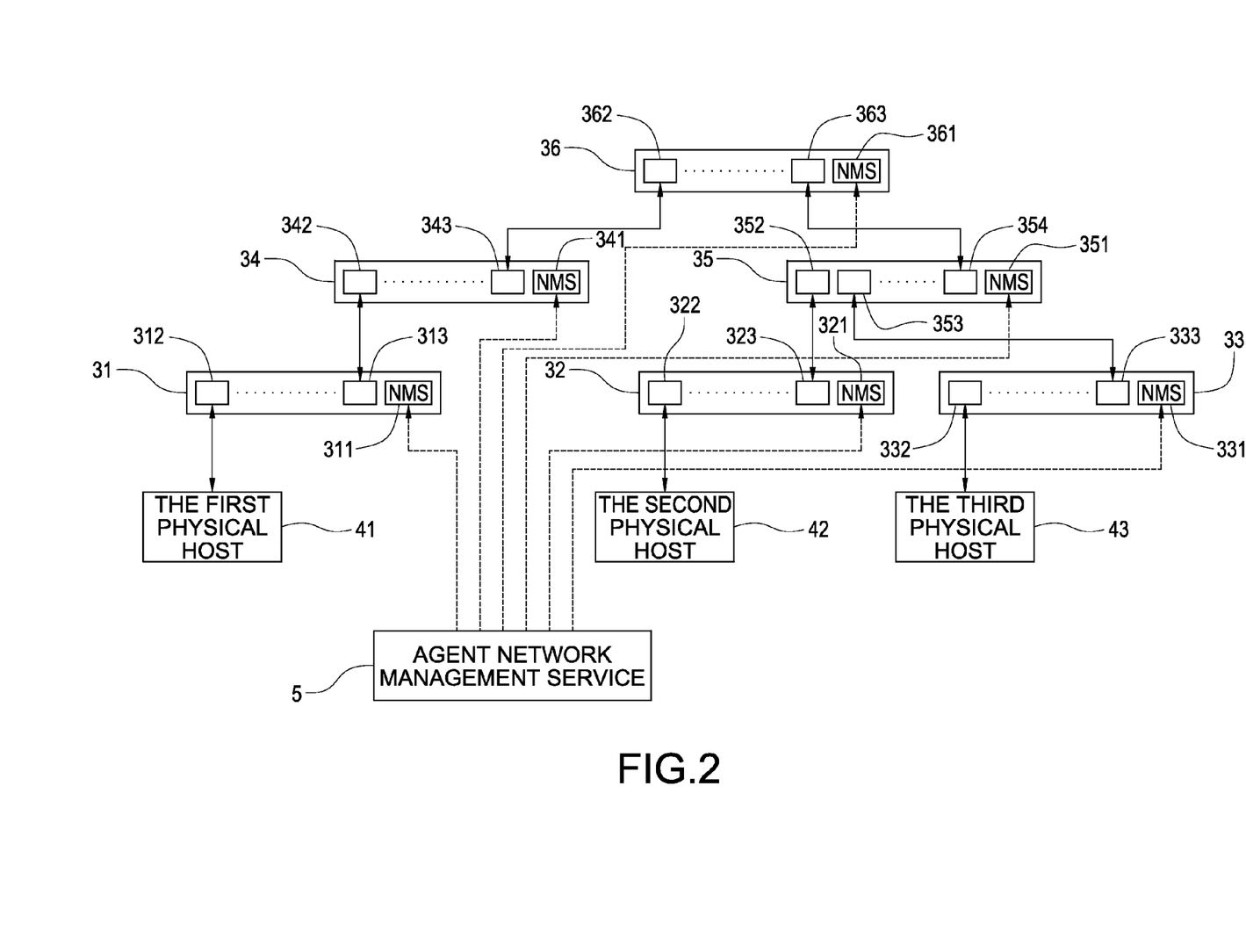
FIG. 2 is a system schematic diagram of a preferred embodiment according to the present invention.

FIG. 2 is a system schematic diagram of a preferred embodiment according to the present invention. In the embodiment, a plurality of switches and a plurality of physical hosts constitute a cloud system. In further details, the example comprises the first switch to the sixth switches 31-36, and the first physical host to the third physical host 41-43.

As shown in FIG. 2, the switches 31-36 respectively have a plurality of connecting ports. In the embodiment, the sixth switch 36 connects with the fourth switch 34 and the fifth switch 35. The fourth switch 34 connects with the first switch 31. The fifth switch 35 connects with the second switch 32 and the third switch 33. And the first switch 31 connects with the first physical host 41, the second switch 32 connects with the second physical host 42, and the third switch 33 connects with the third physical host 43.

In the cloud system, an agent network management service (ANMS) process 5 is executed. Each switch 31-36 respectively executes network management service (NMS) processes 311-361. In the embodiment, the NMS processes 311-361 are used for providing mechanisms for installing, operating and configuring the switches 31-36, but are not limited thereto. Administrators of the cloud system connects with the switches 31-36 via the ANMS process 5 and further communicates with the NMS processes 311-361 to request the NMS processes 311-361 to set up the switches 31-36. The ANMS process 5 is executed in any physical host of the cloud system, and respectively establishes connections with all switches of the cloud system 31-36.

Figure 3:
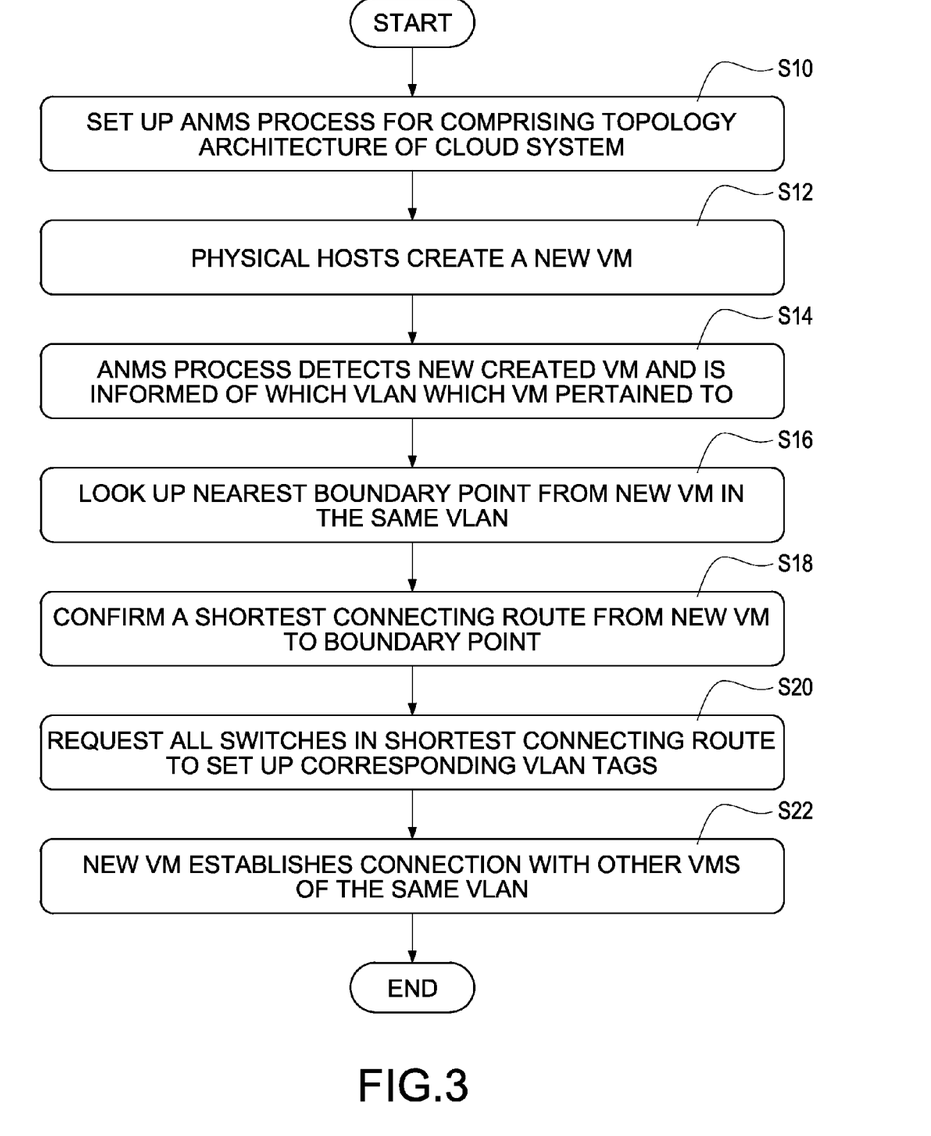
FIG. 3 is a setup flow chart of a preferred embodiment according to the present invention.

FIG. 3 is a setup flow chart of a preferred embodiment according to the present invention. Firstly, before executing the connection method of the present invention, administrators set up the ANMS process 5 for comprising a topology of the cloud system (step S10). The ANMS process 5 confirm connection relationships between the switches 31-36 and the physical host 41-43 via the topology. As shown in FIG. 2, the first physical host 41 connects with the connecting port 312 of the first switch 3, the first switch 31 connects with the connecting port 342 of the fourth switch 34 via the connecting port 313 of the first switch 31, the fourth switch 34 connects to the connecting port 362 of the sixth switch 36 via the connecting port 343 of the fourth switch 34.

Next, one of the plurality of physical hosts 41-43 creates a new virtual machine (VM) (step S12). The ANMS process 5 detects the creation of the new VM, and confirms which virtual local area network (VLAN) the new VM pertained to (step S14). Next, the ANMS process 5 searches a nearest boundary point of the cloud system from the new VM in the same VLAN via the topology (step S16), and further confirms a shortest connecting route from the new VM to the boundary point (step S18). Lastly, the ANMS process 5 communicates with all switches 31-36 in the shortest connecting route, and requests all switches 31-36 in the shortest connecting route to respectively set up internal VLAN tags (step S20) for permitting the transmission of data packets of the VLAN the new VM pertained to. After all switches 31-36 in the shortest connecting route are set up, the new VM establish connection with other VMs of the same VLAN via the shortest connecting route (step S22).

Figure 4:
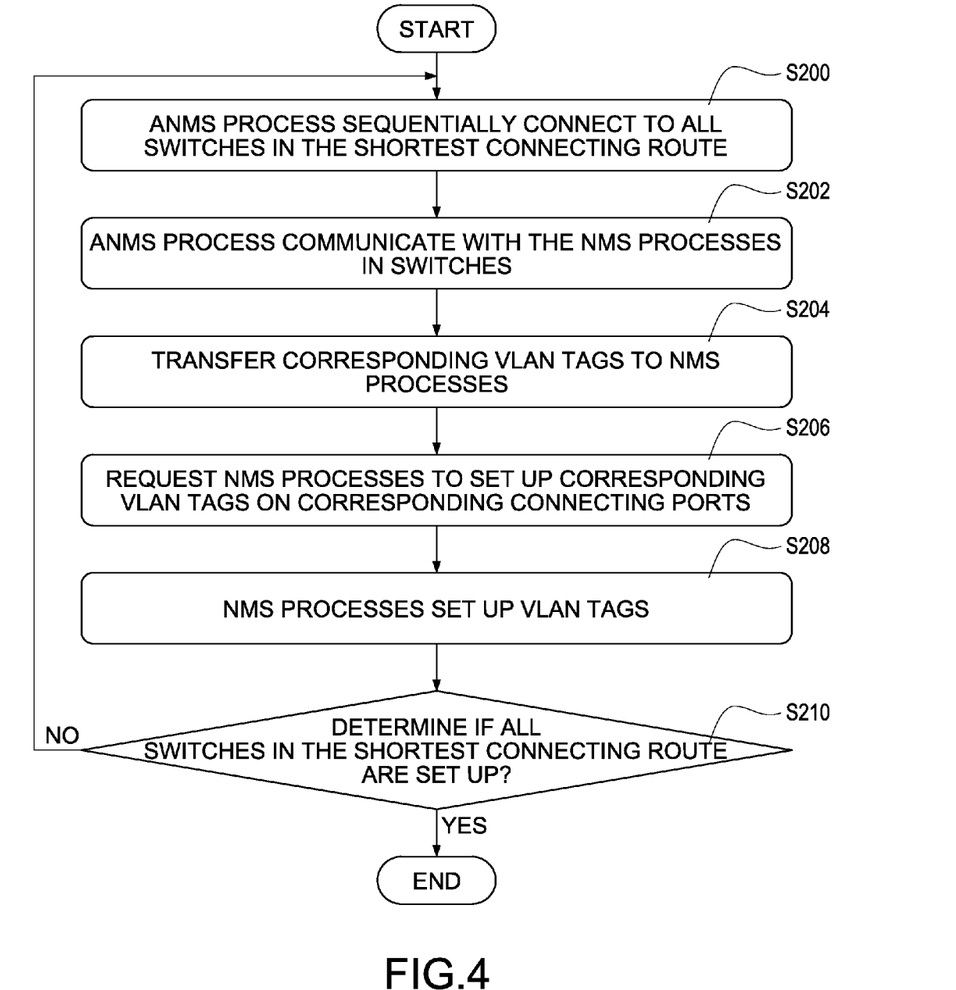
FIG. 4 is a setup flow chart of another preferred embodiment according to the present invention.

FIG. 4 is a setup flow chart of another preferred embodiment according to the present invention. In the above step S20, the ANMS process 5 sequentially connects to all switches 31-36 in the shortest connecting route (step S200), and communicates with the NMS processes 311-361 in the switches 31-36 (step S202). The ANMS process 5 transmits the corresponding VLAN tags to the NMS processes 311-361 (step S204), for requesting the NMS processes 311-361 to set up the corresponding VLAN tags on the corresponding connecting ports of the switches 31-36 (step S206). After the step S206, the NMS processes 311-361 set up the VLAN tags on the corresponding connecting ports according to the request of the ANMS process 5.

After the step S208 is completed, the data packets of the VLAN are permitted to transmit via the set up connecting ports. The new VM is able to transfer data packets via connecting port, and connect with other VMs of the same VLAN. Lastly, the ANMS process 5 determines if all switches 31-36 in the shortest connecting route are set up (step S210). If any of the switches 31-36 is not set up, the step moves back to the step S200, to re-execute the step S200 to step S208 for setting up all switches 31-36 in the shortest connecting route.

Figure 5:
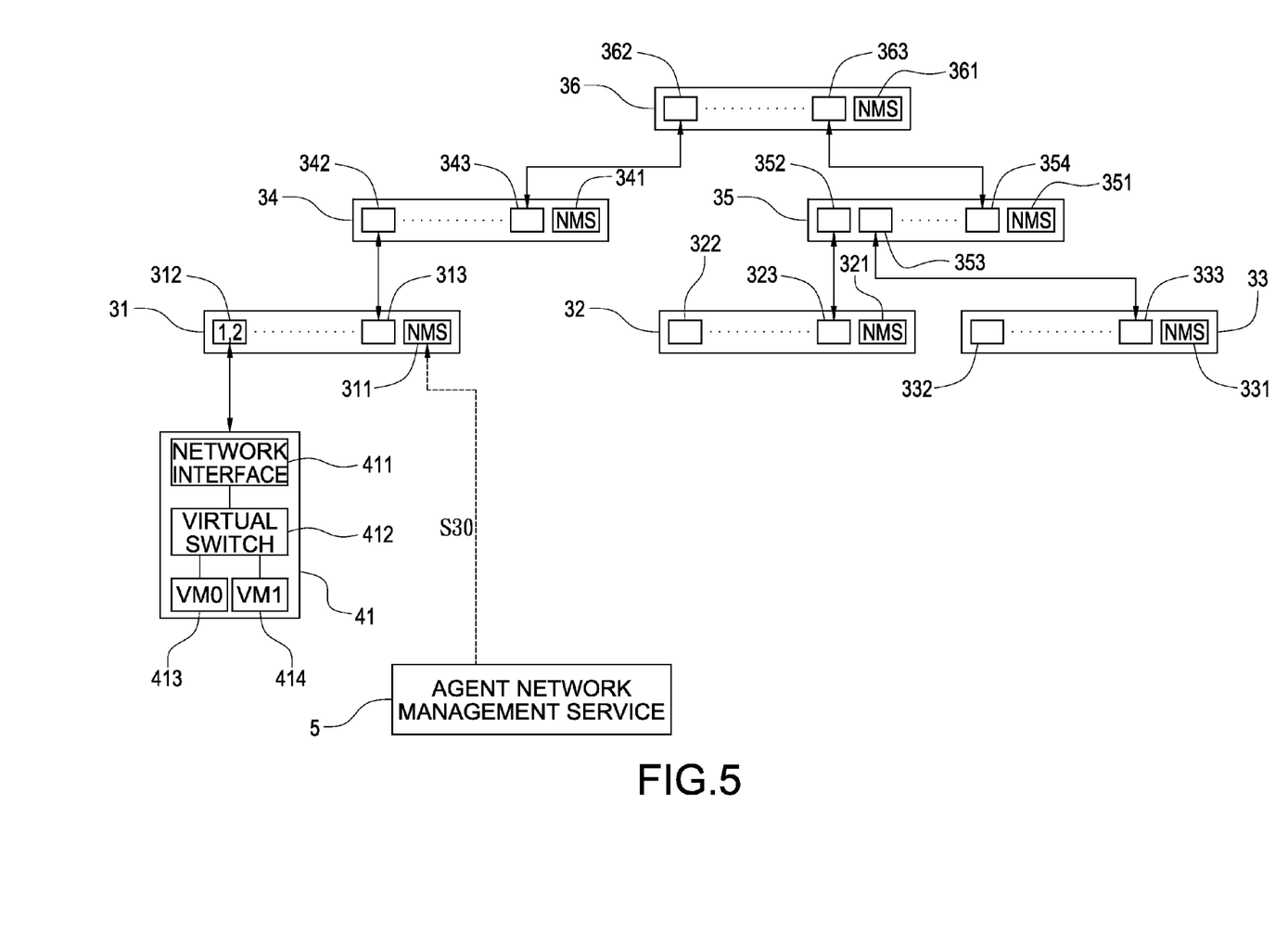
FIG. 5 is the first setup operation schematic diagram of a preferred embodiment according to the present invention.
Figure 6:
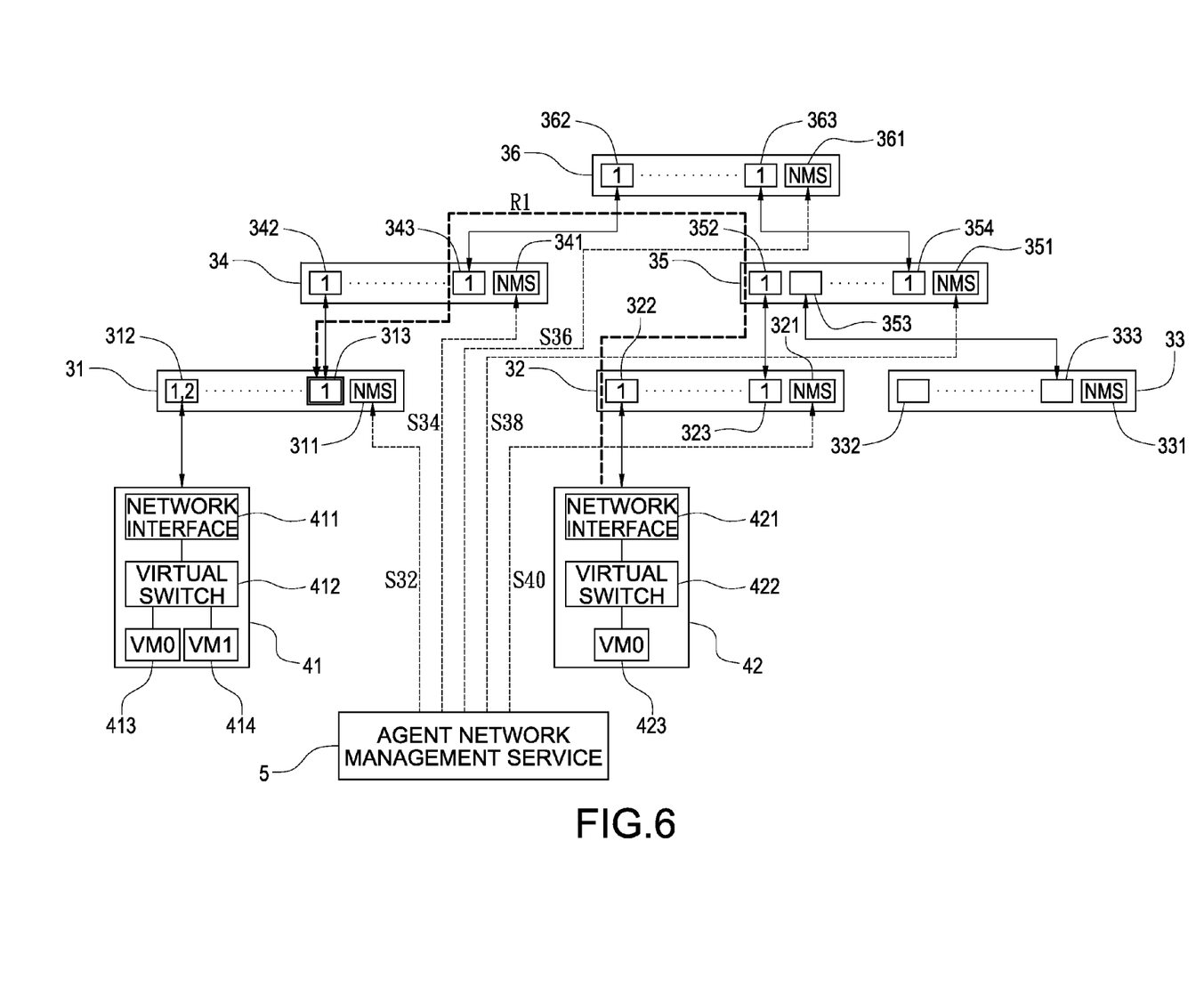
FIG. 6 is the second setup operation schematic diagram of a preferred embodiment according to the present invention.
Figure 7:
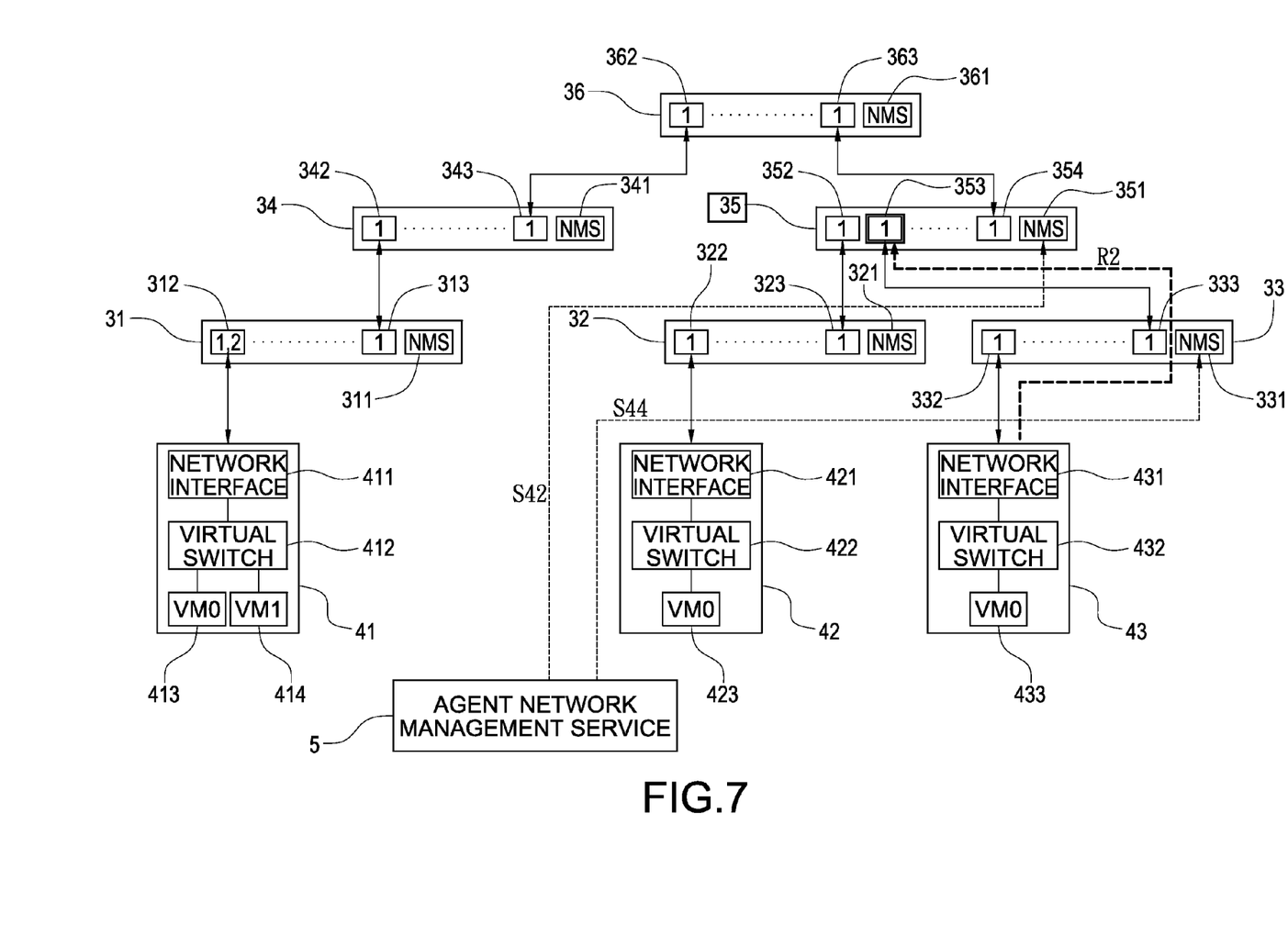
FIG. 7 is the third setup operation schematic diagram of a preferred embodiment according to the present invention.

FIG. 5 to FIG. 7 are the first, the second and the third setup operation schematic diagrams of a preferred embodiment according to the present invention. As shown in FIG. 5, the first physical host 41 has an internal network interface 411 and a virtual switch 412. The first physical host 41 connects to the connecting port 312 of the first switch 31 via the network interface 411, and controls at least one internal VM via the virtual switch 412. In the embodiment, a VM0 413 and VM1 414 internally created by the first physical host 41 are used as the examples in the description. In order to further detail the embodiment, the VM0 413 represents the VM pertaining to VLAN0, and the VM1 414 represents the VM pertaining to VLAN1.

When the VM0 413 and the VM1 414 are created, the ANMS process 5 automatically detects, and confirms the two VM 413 and 414 which respectively pertain to VLAN0 and VLAN1. As a result, the ANMS process 5 communicates with the NMS process 311 of the first switch 31 for requesting the NMS process 311 to set up VLAN tags corresponding to VLAN0 and VLAN1 on the connecting port 312 (step S30). In the embodiment, the tag of VLAN0 is "1" and the tag of VLAN1 is "2", but is not limited thereto.

In the embodiment, the ANMS process 5 regularly scans the switches 31-36 via simple network management protocol (SNMP), for immediately detecting the creation of the new VM. Further, the cloud system further includes a database (not shown in the diagram). When a new VM is created, the data of the new VM is simultaneously recorded in the database. Accordingly, the ANMS process 5 regularly accesses to the database for detecting information of the creation of the new VM. Nonetheless, the above is one of the preferred embodiments of the present invention and is not limited thereto.

In the above first setup operation schematic diagram, there is no other VMs of VLAN0 and VLAN1 in the cloud system created, the two VM 413 and 414 does not need establish connections with other VMs, and operate by default. As a result, the ANMS process 5 does not need to request the first switch 31 to set up the VLAN tag on the connecting port 313.

As shown in FIG. 6, when another VM pertaining to VLAN0 is created (for example the VM0 423 of the second physical host 42), the ANMS process 5 automatically detect via the topology of the cloud system and search for the boundary point nearest from the VM0 423 in the VLAN0. In the FIG. 6, the boundary point is the connecting port 313 of the first switch 31. Further, the ANMS process 5 confirms a shortest connecting route R1 between the VM0 423 and the boundary point (i. e., the connecting port 313). Next, as shown in FIG. 6, the ANMS process 5 sequentially communicates with the switches 31, 34, 36, 35, 32 in the shortest connecting route R1 for requesting the first switch 31 to set up the VLAN tag in the connecting port 313 (step S32), requesting the fourth switch 34 to set up the VLAN tags in the connecting ports 342 and 343 (step S34), requesting the sixth switch 36 to set up the VLAN tags in the connecting port 362 and 363 (step S36), requesting the fifth switch 35 to set up the VLAN tags in the connecting port 352 and 354 (step S38), and requesting the second switch 32 to set up the VLAN tags in the connecting port 322 and 323 (step S40).

It should be noted that, the third switch 33 does not connect to any VM0, the ANMS process 5 does not need to request the third switch 33. The tag "1" of the VLAN0 is not required to be set up on the connecting ports 332 and 333 of the third switch 33. The connecting port 353 of the fifth switch 35 does not connect to any VM0. The tag of the VLAN0 is not required to be set up.

As shown in FIG. 7, when the third switch 33 connects with the third physical host 43, and the third physical host 43 created a VM0 433, the ANMS process 5 automatically detects the created VM0 433, and confirms the VM0 433 pertaining to the VLAN0. The ANMS process 5 searches the boundary point from the VM0 433 in the VLAN0 according to the topology. In the embodiment, the boundary point is the connecting port 353 on the fifth switch 35.

In further details, in the seventh, VMs pertaining to VLAN0 includes VM0 413, 423 and 433. All the connecting ports 312, 313, 342, 343, 362, 363, 352, 354, 322 and 323 between the VM0 413 and 423 are installed with the tag "1" of the VLAN0. Accordingly, as long as the VM0 433 connects to the connecting port 353 of the fifth switch 35, data packets are transferred to the VM0 413 and 423, and the VM0 433 is able to establish connections with the VM0 413 and 423.

After the ANMS process 5 searches a nearest boundary point away from the VM0 433, and then confirms a shortest connecting route R2 between the VM0 433 and the boundary point (i. e., the connecting port 353). The ANMS process 5 sequentially communicates with two switches 33 and 35 in the shortest connecting route R2 for requesting the third switch 33 set up the VLAN tag in the connecting ports 332 and 333 (step S42), and requesting the fifth switch 35 to set up the VLAN tag in the connecting port 353 (step S44). After the step S44, the three VM0 413, 423 and 433 establish connections with each other, and inter-transfer data packets. The VMs of other VLAN are unable to receive the data packets transferred by the three VM0 413, 423 and 433.

Figure 8:
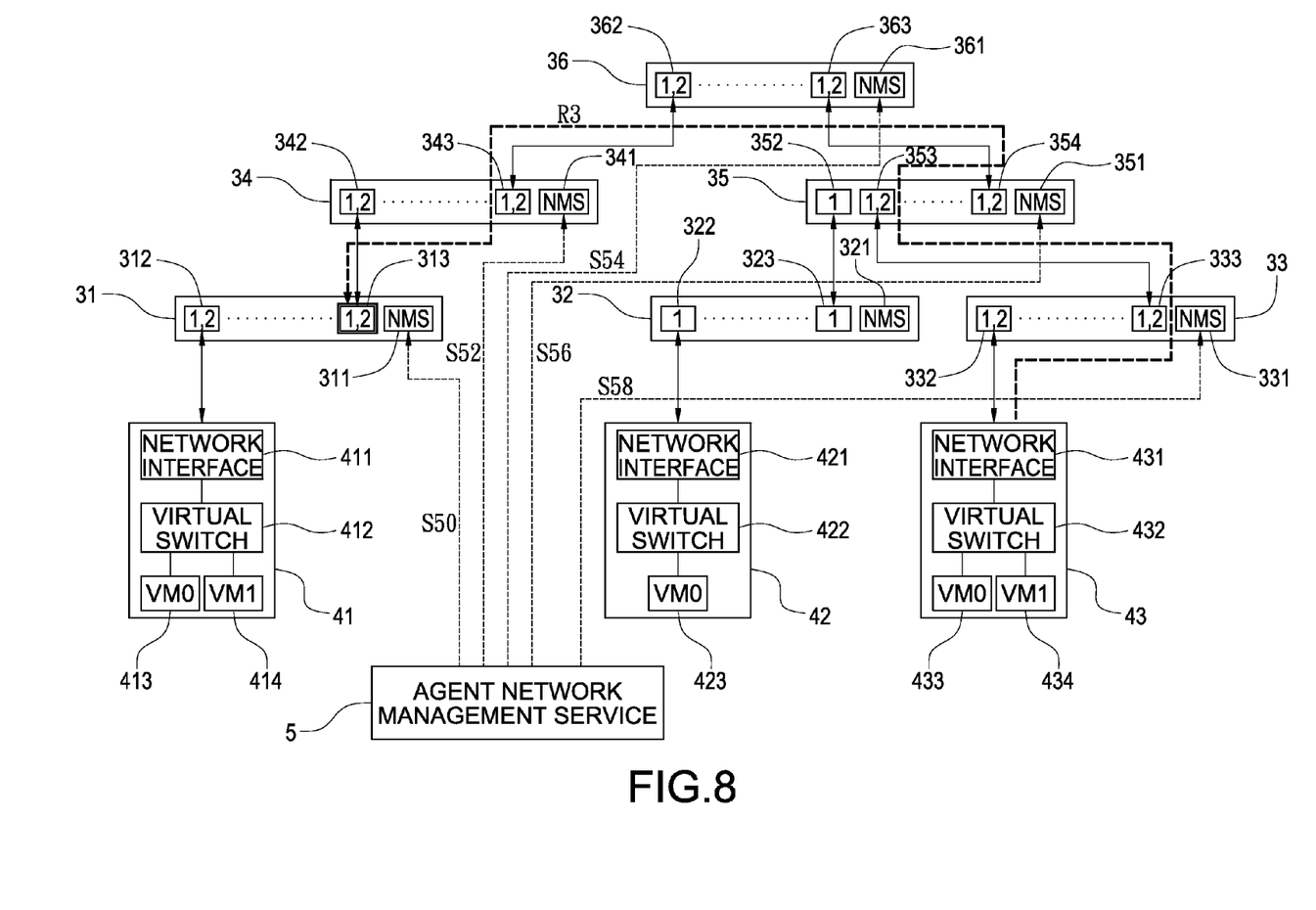
FIG. 8 is the first setup operation schematic diagram of another preferred embodiment according to the present invention.

FIG. 8 is the first setup operation schematic diagram of another preferred embodiment according to the present invention. In the embodiment shown in FIG. 5, the first physical host 41 created the VM1 414 pertaining to the VLAN1, and, the tag "2" of the VLAN1 is installed in the connecting port 312 of the first switch 31. Meanwhile, if the third physical host 43 creates a VM1 434. After the ANMS process 5 detects the created VM1 434, a nearest boundary point from the VM1 434 in the VLAN1 according to the topology is the connecting port 313 on the first switch 31, whereby a shortest connecting route R3 between the connecting port 313 and the VM1 434 is confirmed.

After confirming the shortest connecting route R3, the ANMS process 5 sequentially communicates with the first switch 31, the fourth switch 34, the sixth switch 36, the fifth switch 35 and the third switch 33 for requesting the first switch 31 to set up the VLAN tag in the connecting port 313 (step S50), requesting the fourth switch 34 to set up the VLAN tag in the connecting port 342 and 343 (step S52), requesting the sixth switch 36 to set up the VLAN tag in the connecting port 362 and 363 (step S54), requesting the fifth switch 35 to set up the VLAN tag in the connecting port 353 and 354 (step S56), and requesting the third switch 33 to set up the VLAN tag in the connecting port 332 and 333 (step S58). In the embodiment, a VM1 pertaining to the VLAN1 is not created in the second physical host 42, the connecting port 322, 323 and 352 are not set up with the tag "2" of the VLAN1.

Figure 9:
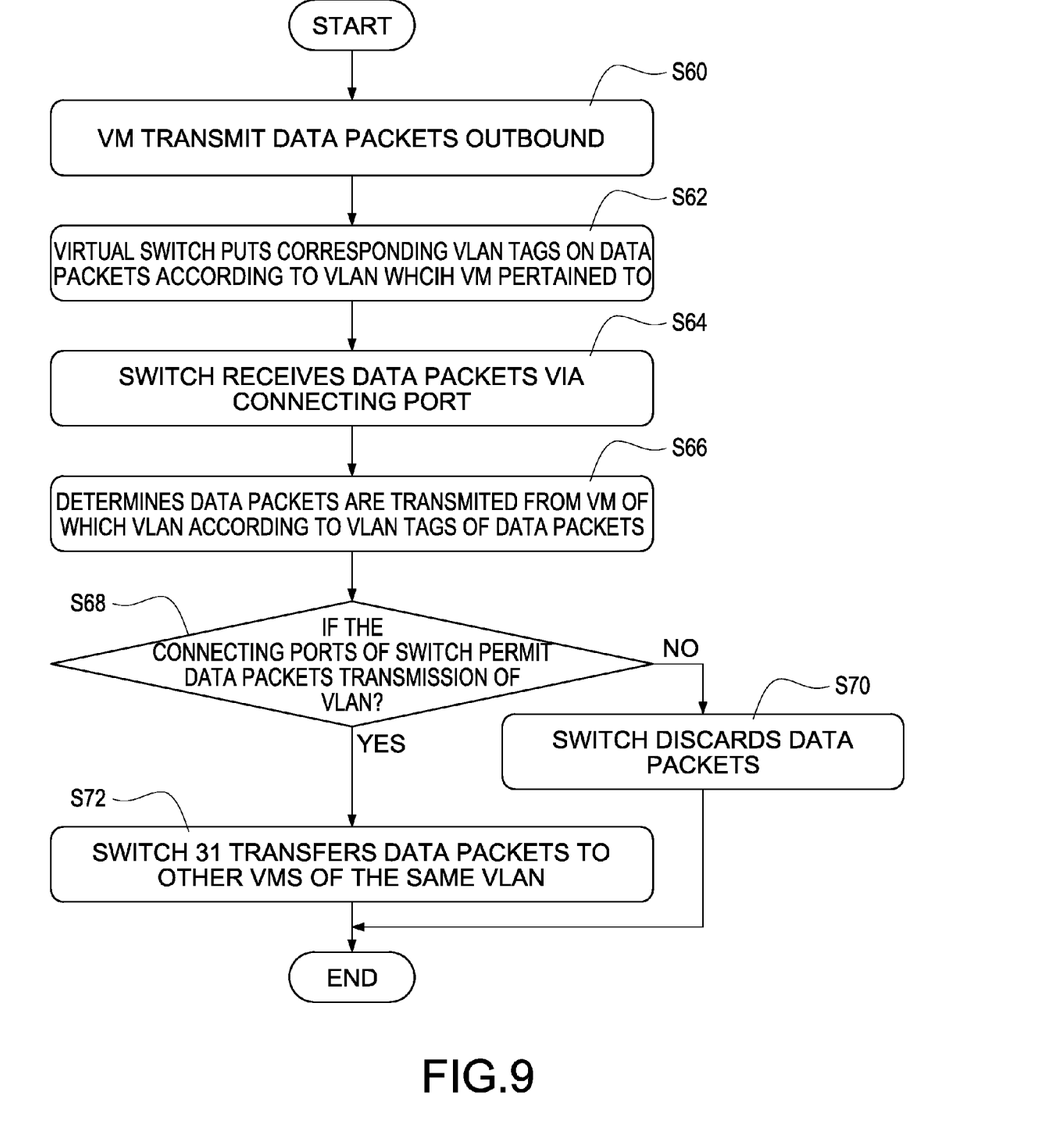
FIG. 9 is a packets transferring flow chart of a preferred embodiment according to the present invention.

FIG. 9 is a packets transferring flow chart of a preferred embodiment according to the present invention. In the embodiment, the first physical host 41, the second physical host 42 and the third physical host 43 respectively have internal network interfaces 411, 421, 431 and virtual switches 412, 422, 432, the three physical hosts 41-43 respectively connect with the upper layer switches 31, 32, 33 via the network interfaces 411-431, and control the internal VMs via the virtual switches 412-432.

Taking the first physical host 41 as an example, when the VM0 413 desires to transmit the data packets outbound (step S60), the virtual switch 412 sets up the corresponding VLAN tags on the data packets according to the VLAN the VM0 413 pertained to (step S62). The VM0 413 pertains to the VLAN0, and the virtual switch 412 sets up the VLAN tag of the "1" on the data packets, and does not limited thereto.

Next, the first switch 31 receives the data packets via the connecting port 312 (step S64). The NMS process 311 retrieves the VLAN tag from the data packets, and determines the data packets pertaining to which VLAN according to the VLAN tag, i. e. the VM of which VLAN transmits the data packets (step S66). Further, the NMS process 311 determines if the connecting ports 312, 313 of the first switch 31 permitting the transmission of the data packets of the VLAN (step S68).

The NMS process 311 inspects if the connecting ports 312, 313 are set up with the tag "1" of the VLAN0 for determining if the connecting ports 312, 313 permits the transmission of the data packets of the VLAN0. If the connecting ports 312, 313 of the first switch 31 do not permit the transmission of the data packets of the VLAN0, the first switch 31 discards the data packets (step S70). On the other hand, if the connecting ports 312, 313 of the first switch 31 permit the transmission of the data packets of the VLAN0, the first switch 31 transfers the data packets to other VMs of the same VLAN (step S72).

As mentioned above, when the first switch 31 permits the data packets transmission, the first switch 31 transfer the data packets to the connecting port 342 of the fourth switch 34 via the connecting port 313. Next, the NMS process 341 in the fourth switch 34 executes the above step S64 to the step S72 for determining if the fourth switch 34 permits to transfer the data packets to the sixth switch 36. When the above steps are repeated with the switches 31-36, the data packets transmitted by the VM0 413 are successfully transferred to the VM0 423 and 433, and, the two VM1 414 and 434 do not receive the data packets. Thus, VMs of different VLANs are completely separated.

As the skilled person will appreciate, various changes and modifications can be made to the described embodiments. It is intended to include all such variations, modifications and equivalents which fall within the scope of the invention, as defined in the accompanying claims.

What is claimed is:

1. A method for connecting virtual machines in a cloud system, the cloud system having a plurality of switches, each switch respectively having several connecting ports, each switch inter-connected via the connecting ports, and connecting to a plurality of physical hosts in the cloud system, and the method including:
   a) one of the plurality of physical hosts creating a new virtual machine (VM);
   b) the cloud system executing an agent network management service (ANMS) process for detecting a creation of the new VM, and confirming which virtual local area network (VLAN) the new VM pertained to;
   c) the ANMS process searching a nearest boundary point from the new VM in the same VLAN;
   d) the ANMS process confirming a shortest connecting route from the new VM to the boundary point; and
   e) the ANMS process communicating sequentially with all switches of the shortest connecting route, and requesting the switches to set up internal VLAN tags, for permitting the transmission of data packets from the VLAN the new VM pertained to.

2. The method for connecting virtual machines in a cloud system of claim 1, wherein the ANMS process scans the switches via simple network management protocol (SNMP) for detecting the creation of the new VM in the step b.

3. The method for connecting virtual machines in a cloud system of claim 1, wherein the cloud system further includes a database, when the new VM is created, the data of the new VM is recorded in the database, in the step b, the ANMS process accesses to the database for detecting the creation of the new VM.

4. The method for connecting virtual machines in a cloud system of claim 1, wherein the ANMS process is executed in any physical host of the cloud system, and respectively establishes connection with all switches of the cloud system.

5. The method for connecting virtual machines in a cloud system of claim 1, wherein the ANMS process includes a topology of the cloud system, in the step c and the step d, the ANMS process searches the boundary point, and confirms the shortest connecting route via the topology.

6. The method for connecting virtual machines in a cloud system of claim 1, wherein further includes a step f: the new VM establishes connection with other VMs in the VLAN the new VM pertained to via the setup switches.

7. The method for connecting virtual machines in a cloud system of claim 1, wherein the switches respectively executes a network management service (NMS) process for providing mechanisms to install, operate and configure the switches, in the step e, the ANMS process communicates respectively with the NMS process in the switches.

8. The method for connecting virtual machines in a cloud system of claim 7, wherein the step e further includes the following steps:
   e1) the ANMS process connecting to any switch in the shortest connecting route;
   e2) the ANMS process communicating with the NMS process in the switch;
   e3) requesting the NMS process to set up corresponding VLAN tags on corresponding connecting ports in the switch, wherein the VLAN tags correspond to the VLAN the new VM pertained to;
   e4) the NMS process setting up the VLAN tag according to the request;
   e5) the ANMS process determining if all switches in the shortest connecting route are set up; and
   e6) if there are switches not set up in the shortest connecting route, repeat executing from the step e1 to the step e5.

9. The method for connecting virtual machines in a cloud system of claim 1, wherein the plurality of physical hosts respectively has a network interface and a virtual switch, each the physical host respectively connects to any connecting port on the switch via the network interface, and controls at least one VM via the virtual switch.

10. The method for connecting virtual machines in a cloud system of claim 9, wherein the method further including following steps:
   f) one of the VM in the physical host transmitting the data packets outbound;
   g) the virtual switch set up corresponding VLAN tags on the data packets according to the VLAN the VM pertained to;
   h) the switch receiving the data packets via the connecting port connected with the physical host;
   i) the switch retrieving the VLAN tags from the data packets to confirm which VLAN the data packets pertained to;
   j) determining if the connecting ports of the switches permitting the transmission of the data packets of the VLAN;
   k) if connecting ports of the switches does not permit the transmission of the data packets of the VLAN, the switch discarding the data packets; and
   l) if connecting ports of the switches permit the transmission of the data packets of the VLAN, the data packets are transferred to other VMs in the same VLAN.

11. A method for connecting virtual machines in a cloud system, the cloud system having a plurality of switches and a plurality of physical hosts, each switch respectively inter-connecting with the plurality of physical hosts via several connecting ports on each switch, wherein the cloud system executes an agent network management service (ANMS) process, and the switches respectively executes a network management service (NMS) process for communicating with the ANMS process, the method including:
   a) creating, by one of the plurality of physical hosts, a new VM;
   b) the ANMS process detecting the creation of the new VM, and confirming which VLAN the new VM pertained to;
   c) the ANMS process searching a nearest boundary point from the new VM in the same VLAN;
   d) the ANMS process confirming a shortest connecting route from the new VM to the boundary point;
   e) the ANMS process respectively communicating with the NMS processes of all switches in the shortest connecting route;
   f) the ANMS process transferring the VLAN tag of the VLAN of the new VM to the NMS processes;
   g) the ANMS process requesting the NMS processes respectively setting up the VLAN tag of the switches, for permitting the transmission of the data packets from the VLAN the new VM pertained to; and
   h) the new VM establishing connection with other VMs in the VLAN the new VM pertained to via the setup switches.

12. The method for connecting virtual machines in a cloud system of claim 11, wherein the ANMS process requests the NMS process to set up the corresponding VLAN tag on corresponding connecting port on the switch in the step g.

13. The method for connecting virtual machines in a cloud system of claim 11, wherein the ANMS process scans the switches via simple network management protocol (SNMP) for detecting the creation of the new VM in the step b.

14. The method for connecting virtual machines in a cloud system of claim 11, wherein the cloud system further includes a database, when the new VM is created, the data of the new VM is recorded in the database, in the step b, the ANMS process accessing to the database for detecting the creation of the new VM.

15. The method for connecting virtual machines in a cloud system of claim 11, wherein the ANMS process is executed in any physical host of the cloud system, and respectively establishes connection with all switches of the cloud system.

16. The method for connecting virtual machines in a cloud system of claim 11, wherein the ANMS process includes a topology of the cloud system, in the step c and the step d, the ANMS process searches the boundary point, and confirms the shortest connecting route via the topology.

17. The method for connecting virtual machines in a cloud system of claim 11, wherein the plurality of physical hosts respectively having a network interface and a virtual switch, each the physical host respectively connects to any connecting port on the switch via the network interface, and control at least one VM via the virtual switch.

18. The method for connecting virtual machines in a cloud system of claim 17, wherein further including the following steps:
  i) one of the VM in the physical host transmitting data packets outbound;
  j) the virtual switch setting up corresponding VLAN tags on the data packets according to the VLAN the VM pertained to;
  k) the switch receiving the data packets via the connecting port connected with the physical host;
  l) the switch retrieving the VLAN tags from the data packets to confirm which VLAN the data packets pertained to;
  m) determining if the connecting ports of the switches permitting the transmission of the data packets of the VLAN;
  n) if connecting ports of the switches does not permit the transmission of the data packets of the VLAN, the switch discarding the data packets; and
  o) if connecting ports of the switches permit the transmission of the data packets of the VLAN, the data packets are transferred to other VMs in the same VLAN.

19. A cloud system including:
  a plurality of switches, each switch respectively having several connecting ports, executing a network management service (NMS) process therein, and inter-connected via the connecting ports;
  a physical host, connected to one of the plurality of switches, and creating a new virtual machine (VM) therein; and
  an agent network management service (ANMS) process for detecting a creation of the new VM, confirming which virtual local area network (VLAN) the new VM pertained to, and the ANMS process including a VLAN tag of the VLAN of the new VM, and a topology of the cloud system;
  wherein, when the new VM is created, the ANMS process searches a nearest boundary point from the new VM in the same VLAN, and confirms a shortest connecting route from the new VM to the boundary point via the topology, and the ANMS process transfers the VLAN tag to the NMS processes of the plurality of switches of the shortest connecting route, and requests the NMS processes respectively setting up the VLAN tag on corresponding connecting ports in the switches, for permitting the transmission of data packets from the VLAN the new VM pertained to, and the new VM establishes connection with other VMs in the VLAN the new VM pertained to via the setup switches.

20. The cloud system of claim 19, wherein further including a database, when the new VM is created, the data of the new VM is recorded in the database, and the ANMS process accesses to the database for detecting the creation of the new VM.

* * * * *